United States Patent
Choi

(10) Patent No.: US 6,879,628 B1
(45) Date of Patent: Apr. 12, 2005

(54) APPARATUS AND METHOD FOR MEASURING THE BIT ERROR RATIO OF A TRANSMISSION SYSTEM

(75) Inventor: Joong-Kyu Choi, Seoul (KR)

(73) Assignee: LG Information & Communications, Ltd., Seoul (KR)

(*) Notice: Subject to any disclaimer, the term of this patent is extended or adjusted under 35 U.S.C. 154(b) by 696 days.

(21) Appl. No.: 09/641,679

(22) Filed: Aug. 18, 2000

(30) Foreign Application Priority Data

Aug. 20, 1999 (KR) ........................................ 1999/34686

(51) Int. Cl.[7] .............................................. H04B 17/00
(52) U.S. Cl. ...................... 375/224; 375/228; 714/704; 714/705; 714/718
(58) Field of Search .............................. 375/224, 228; 714/704, 705, 708, 718, 785

(56) References Cited

U.S. PATENT DOCUMENTS 5,764,651 A * 6/1998 Bullock et al. ............. 714/708
6,170,069 B1 * 1/2001 Ohtani et al. ............... 714/704
6,310,911 B1 * 10/2001 Burke et al. ................ 375/224

FOREIGN PATENT DOCUMENTS

EP      1253737 A1 * 10/2002 ............. H04L/1/24

* cited by examiner

Primary Examiner—Shuwang Liu
(74) Attorney, Agent, or Firm—Fleshner & Kim, LLP

(57) ABSTRACT

An apparatus and method for measuring the bit error ratio of a transmission system is provided, which can accurately report the degradation of the service quality of a line to an operator by accurate BER calculation under an exceptional situation where an excessive error is instantaneously generated. This is preferably accomplished by storing the number of bit errors in buffers at an interval of time T, scoping these buffers by a sliding window of a preset size, and judging whether or not an E-BER alarm is generated using the average number of bit errors of the scoped sliding window buffers. In addition, it is also possible to intermittently report an error repair situation under which an error is generated by scoping buffers by a sliding window of a set size and judging whether or not an E-BER alarm is cleared using the average number of errors of the scoped sliding window buffers, for thereby accurately and rapidly operating the system.

11 Claims, 3 Drawing Sheets

APPARATUS AND METHOD FOR MEASURING THE BIT ERROR RATIO OF A TRANSMISSION SYSTEM

BACKGROUND OF THE INVENTION

1. Field of the Invention

The present invention relates to a transmission system, and more particularly to an apparatus and method for measuring the bit error ratio of a transmission system.

2. Background of the Related Art

Typically, in a transmission system, such as a fiber loop carrier (FLC) for example, service quality of a corresponding line is measured by calculating the bit error of all signals received by means of E1, DS1, DS3, STM-1, etc. In addition, the degradation of service quality must be determined according to a method for measuring the Bit Error Ratio (BER), and the result must be reported to the operator of the transmission system by means of warning or event reporting.

In a related art BER measuring method, where the BER for determining that the service quality of a transmission line in a normal state is unacceptable is set to 10E-3, and the BER for determining that the service quality of a transmission line in an abnormal state is acceptable is set to 10E-4, a counter is incremented according to the number of errors generated, and a line failure alarm is generated if errors continue at the ratio of 10E-3 for an alarm occurrence duration time (e.g., 2 seconds) for deciding a line failure generation. In addition, after the error generation, if there is no error for an alarm clearing duration time (e.g., 10 seconds) for deciding the repair of the line failure, or if errors continue at the ratio of less than 10E-4, the release of the line failure is determined.

In the above-described related art method for measuring the BER, if the generation of an bit error of a transmission line continues for a predetermined time (alarm generation duration time) at more than a certain ratio, a line failure alarm can be generated.

However, where excessive error is generated instantaneously (for example, when excessive error exceeding 10E-2 within one second is generated in a 2-second interval), an alarm may be not generated even though an error exceeding 10E-3 BER is generated. In addition, when an error is generated intermittently after an error generation (e.g., when an error exceeding 10E-4 for one second of 10 seconds is generated), the alarm may be not cleared and the alarm state may be continued even though the error generation ratio has decreased to less than 10E-4.

As illustrated in FIG. 1, when excessive error is generated instantaneously, with the number of errors being $2*N_3$ at a period of time T, 0 at a period of time 2T, and $2*N_3$ at a period of time 3T, the BER at this time is termed Excessive-BER (E-BER). Here, $N_3$ is the number of error generation of 10E-3 BER during a predetermined period of time T, and $A_G$ is a bit error counter.

In addition, a bit error counter, E-BER generation flag, and E-BER clearing flag are placed at each line of the transmission system. Then, a bit error value is read and is accumulated at a time interval of t (e.g., 10 ms) which is less than the period of time T.

Accordingly, when time T begins, the system determines whether or not the count value of the bit error counter exceeds the BER of time T. If it does, the E-BER generation flag is set. If the bit error count value exceeds the BER of time T at the next period of time T, it is determined that the E-BER is continuously maintained. However, if the bit error counting value becomes less than the BER of time T at the next time T, the E-BER generation flag is reset and the BER calculation is started again at the next period of time T.

Consequently, if the E-BER generation flag is set and continued during an alarm generation duration time, an E-BER alarm is generated. In addition, after the generation of the E-BER alarm, if the bit error count value is calculated at an interval of time T, and is continuously maintained at less than an alarm clearing BER, the E-BER alarm is cleared.

In the related art method for measuring the bit error ratio of a transmission system, when excessive error is continuously or instantaneously generated as illustrated in FIG. 1, there is a problem that an E-BER alarm is erroneously not generated because an error is not generated during an alarm generation duration time.

In addition, after the generation of an alarm, when an error is maintained intermittently for a long period, there is a problem that an E-BER alarm is not cleared although an E-BER alarm must be cleared because an error is generated at less than an alarm clearing BER.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide an apparatus and method for measuring the bit error ratio of a transmission system that substantially obviates one or more of the problems caused by the disadvantages of the prior part.

Another object of the invention is to provide an apparatus and method for measuring the bit error ratio of a transmission system that makes it possible to accurately report the degradation of the service quality of a line to an operator under a situation where an excessive error is instantaneously generated.

Another object of this invention is to provide an apparatus and method for measuring the bit error ratio that stores the number of bit errors in buffers at an interval of time T, scopes these buffers by a sliding window of a preset size, and judges whether or not an E-BER alarm is generated using the average number of bit errors of the scoped sliding window buffers.

It is another object of the present invention to provide an apparatus and method for measuring the bit error ratio of a transmission system which makes it possible to intermittently report an error repair situation under which an error is generated, by scoping buffers using a sliding window of a prescribed size, and judging whether or not an E-BER alarm is cleared using the average number of errors of the scoped sliding window buffers, for thereby accurately and rapidly operating the system. The window size is preferably dynamically changeable.

To achieve these objects and other advantages, in whole or in parts, there is provided an apparatus for measuring the bit error ratio of a transmission system, including an error detector for detecting a bit error generated in a corresponding transmission line; an error storing unit for sequentially storing the number of bit errors detected in the error detector during the period of time T; a plurality of buffers for storing the number of bit errors at an interval of time T; and an E-BER alarm detector for scoping the plurality of buffers by dynamically changing the size of a sliding window, calculating the average number of bit errors of the scoped sliding window buffers, and judging whether or not the E-BER alarm is generated as the result of the calculation.

To achieve these objects and other advantages, in whole or in parts, there is further provided a method for measuring the bit error ratio of a transmission system including setting a plurality of buffers capable of accumulating the number of errors by a corresponding signal of the transmission system at a certain interval of time T and initializing the same; storing the number of bit errors generated during the period of time T after the above initialization step; scoping predetermined buffers among the plurality of buffers by a sliding window after the above storing step; and determining whether or not an E-BER alarm is generated using the scoped sliding window buffer.

To achieve these objects and other advantages, in whole or in parts, there is further provided a method for measuring the bit error ratio of a transmission system, which includes setting an E-BER error generation duration time for judging whether or not an excessive error is instantaneously generated; setting an E-BER error repairing duration time for judging whether or not the E-BER alarm is cleared when an error is intermittently generated after E-BER alarm is generated; calculating the average number of bit errors of the sliding window buffer corresponding to the above E-BER error generation duration time; judging whether or not an error is instantaneously generated according to the average number of bit errors, and, as a result, generating an E-BER alarm when it is the state in which an excessive error is instantaneously generated; and calculating the average number of bit errors of the sliding window buffer corresponding to the E-BER error repairing duration time after the generation of the E-BER alarm, judging whether or not an error is intermittently generated according to the average number of bit errors, and, as the result, clearing the E-BER alarm when the error is repaired.

To achieve these objects and other advantages, in whole or in parts, there is further provided a method for measuring the bit error ratio of a transmission system that includes initializing a plurality of buffers, storing a number of bit errors generated in a transmission during a period of time T in the plurality of buffers, monitoring a portion of buffers among the plurality of buffers for a dynamically changing period less than T, and determining an average number of bit errors in the monitored portion of buffers.

To achieve these objects and other advantages, in whole or in parts, there is further provided a method for measuring the bit error ratio of a transmission system that includes setting and initializing a plurality of buffers, which are capable of accumulating a number of bit errors in a signal of the transmission system at a prescribed interval of time T, storing the number of bit errors generated during the period of time T, determining whether an Excessive Bit Error Ratio (E-BER) alarm has been generated, selecting and scoping a set of the plurality of buffers from a current buffer to one of a first and second prescribed buffer, determining whether the E-BER alarm should be generated based on the average number of bit errors in the scoped buffers to the first prescribed buffer after an elapse of the period of time T, if the E-BER alarm has not been previously generated, and determining whether the E-BER alarm should be cleared based on the average number of bit errors in the scoped buffers from the current buffer back to the second prescribed buffer after an elapse of the period of time T, if the E-BER alarm has previously been generated.

To achieve these objects and other advantages, in whole or in parts, there is further provided an apparatus for measuring the bit error ratio of a transmission system that includes a first error detector to detect a bit error generated in a transmission line, an error storing unit, to sequentially store a number of bit errors detected in the first error detector during the period of time T, a plurality of buffers to store the number of bit errors at an interval of time T, and a second error detector to monitor at least a portion of buffers of the plurality of buffers, and determine an average number of bit errors within the portion of buffers.

To achieve these objects and other advantages, in whole or in parts, there is further provided a method for measuring the bit error ratio of a transmission system that includes setting an E-BER error generation duration time for judging whether or not an excessive error is instantaneously generated, setting an E-BER error repairing duration time for judging whether or not the E-BER alarm is cleared when an error is intermittently generated after E-BER alarm is generated, calculating an average number of bit errors of a sliding window buffer corresponding to the E-BER error generation duration time, judging whether an error is instantaneously generated according to an average number of bit errors, and generating an E-BER alarm if an excessive error is instantaneously generated, and calculating the average number of bit errors of the sliding window buffer corresponding to the E-BER error repairing duration time after the generation of the E-BER alarm, judging whether or not an error is intermittently generated according to the average number of bit errors, and clearing the E-BER alarm when the error is repaired.

To achieve these objects and other advantages, in whole or in parts, there is further provided a method of measuring the bit error ratio in a transmission system that includes initializing a plurality of buffers, accumulating a number of bit errors in a transmission signal during a first prescribed time interval, determining an active or inactive state of an excessive bit error ratio (E-BER) alarm, and performing one of generating and clearing the E-BER alarm based on the average number of errors in a dynamically changing segment of the plurality of buffers.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
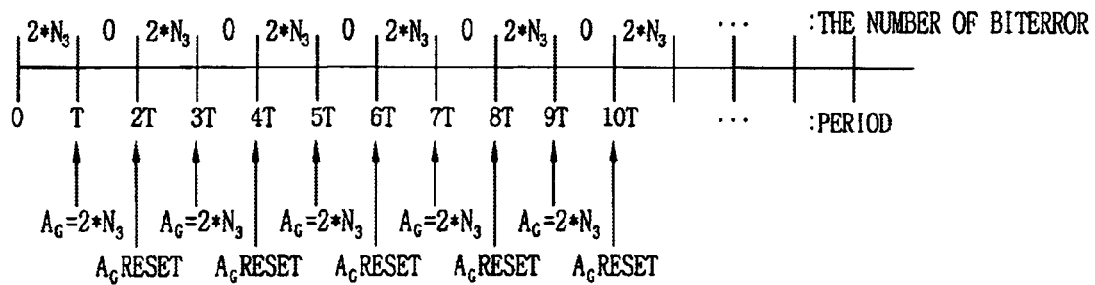
FIG. 1 is a drawing illustrating a method for measuring the bit error ratio of a transmission system using a bit error counter in a related art system.
Figure 2:
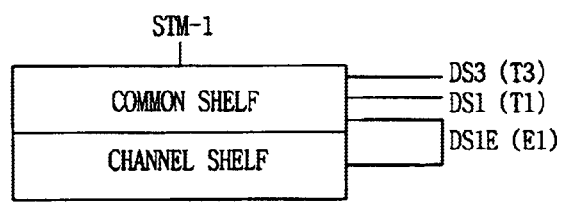
FIG. 2 is a block diagram illustrating the block of a fiber loop carrier (FLC) in accordance with a preferred embodiment of the present invention.

FIG. 2 illustrates a FLC block construction in accordance with a preferred embodiment of the present invention. As shown therein, a common shelf preferably transmits and receives light signals at 155 Mbps. A channel shelf transmits electrical signals extracted from the light signals from the common shelf by demultiplexing the light signals, and transmits the signals transmitted through each transmission line to the common shelf by multiplexing those signals.

An apparatus for measuring the bit error ratio of a transmission system in accordance with a preferred embodiment of the present invention is positioned within the channel shelf, and measures the bit error ratio to determine the service quality of a corresponding transmission line.

Figure 3:
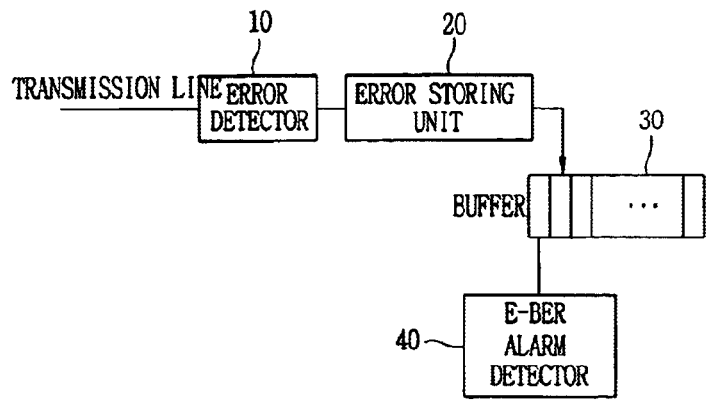
FIG. 3 is a block diagram illustrating the block of an apparatus for measuring the bit error ratio of a transmission line in accordance with a preferred embodiment of the present invention.

The block construction of the above apparatus for measuring the bit error ratio is illustrated in FIG. 3. As shown in FIG. 3, the apparatus for measuring the bit error ratio of a transmission system includes an error detector 10 for detecting a bit error generated in a corresponding transmission line. It further includes an error storing unit 20, for sequentially storing the number of bit errors detected in the error detector 10 during the period of time T, and a plurality of buffers 30 for storing the number of bit errors at an interval of time T.

An Excessive Bit Error Ratio (E-BER) alarm detector 40 is provided for scoping or monitoring at least a portion of the plurality of buffers 30 by dynamically changing the size of a sliding window, calculating the average number of bit errors of the scoped sliding window buffers, and determining whether or not the E-BER alarm has been generated as the result of the calculation. For example, a subset of the plurality of buffers 30 is examined, and the average number of bit errors within the subset is determined. The size of the subset can be dynamically changed to examine more or fewer buffers within the plurality of buffers 30. Thus, a portion of buffers among the plurality of buffers can be monitored for a dynamically changing period of time, which is preferably less than time period T.

Figure 5:
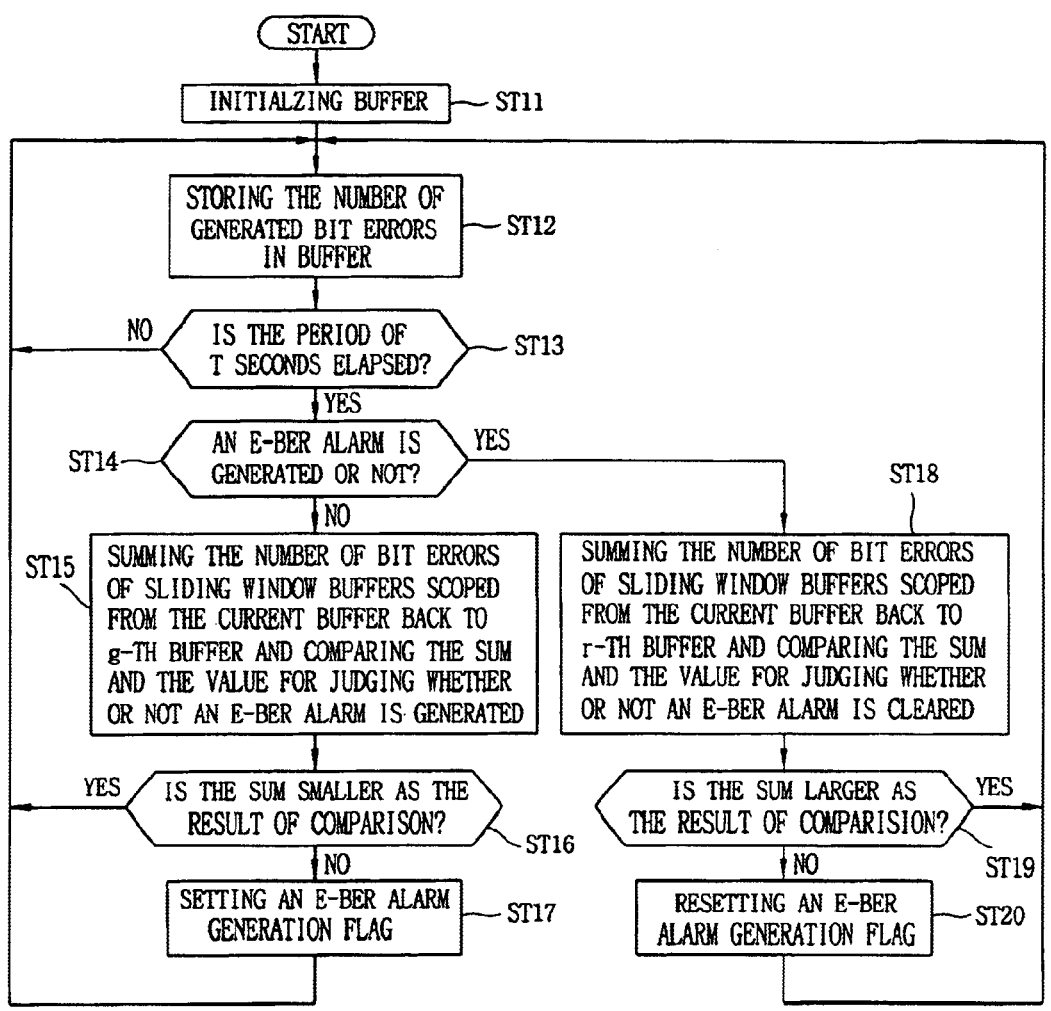
FIG. 5 is a drawing illustrating a method for measuring the bit error ratio of a transmission system in accordance with a preferred embodiment of the present invention.

The method for measuring the bit error ratio of a transmission system in accordance with a preferred embodiment of the present invention is illustrated in FIG. 5. As shown in FIG. 5, the met hod for measuring the bit error ratio of a transmission system includes the initialization step of setting and initializing a plurality of buffers capable of accumulating the number of errors in a corresponding signal of the transmission system at a certain time interval T as shown in step ST11. Next, the number of bit errors generated during the period of time T after the above initialization step are stored, in accordance with step ST12. Then, it is determined whether or not an E-BER alarm is generated after the above storing step, as shown in steps ST13 and ST14.

In steps ST15 through ST17, if the E-BER alarm has not been generated as the result of determination in the above step, it is determined whether or not the E-BER alarm should be generated according to the average number of bit errors of the scoped sliding window buffers starting in the current buffer and go in back to the g-th buffer, after the period of time T has elapsed.

If, however, the E-BER alarm has been generated as the result of the determination in the above step, it is determined whether the E-BER alarm should be cleared by judging whether or not the E-BER alarm should be generated according to the average number of bit errors of the sliding window buffers scoped from the current buffer back to a r-th buffer after the period of time T has elapsed, as shown in steps ST18 through ST20.

The E-BER alarm generation step shown in steps ST15 through ST17 includes scoping g-number of buffers from the current buffer (including the current buffer) by using a sliding window after the period of time T has elapsed, as shown in step ST15. If an E-BER alarm has not been generated as the result of this determination, an E-BER error generation duration time is gT, and the number of 10E-3 BER errors generated during a period of time T is $N_3$. Next, the number of bit errors of the scoped sliding window buffers are summed and the average number of bit errors are calculated, in accordance with step ST15. The calculated average number of bit errors of the sliding window buffers are compared with $N_3$ in step ST16, and an E-BER alarm generation flag is set in step ST17, if the average number of bit errors is not less than $N_3$.

If, however, the average number of bit errors is less than $N_3$ based on the comparison, step ST16 includes determining that it is not appropriate to generate an E-BER alarm and reforming the sliding window buffers by moving the sliding window as far as the period of time T.

The E-BER alarm clearing step described in steps ST18 through ST20 includes the step of scoping r-number of buffers (including the current buffer) after a period of time T has elapsed, as shown in step ST18, if an E-BER alarm is generated as a result of determination of step ST13, an E-BER error repair duration time is rT, and the number of 10E-4 BER error generated at a period of time T is $N_4$. Next, the number of bit errors of the scoped sliding window buffers is summed and the average number of bit errors is calculated in step ST18. The calculated average number of bit errors of the sliding window buffers is then compared with $N_4$, in step ST19, and if the average number of bit errors is not more than $N_4$ as the result of the comparison, an E-BER alarm clearing flag is set in step ST20. If, however, the average number of bit errors is more than $N_4$ based on the comparison, the E-BER alarm generation state is maintained, as shown in step ST19.

The method for measuring the bit error ratio of a transmission system in accordance with a preferred embodiment of the present invention will now be described. First, a plurality of buffers B[n] 30 having n number of storage regions capable of accumulating the number of bit errors by each signal of the transmission system is provided. When the transmission system is driven at an initial stage, the values of the buffers B[n] are all initialized to "0" in ST11.

Next, when the period of time T begins, the number of bit errors generated during the period of time T is read out from the error detector 10 at an interval of time t (t<T), and is accumulated and stored in B[i] which is i-th storing region of the buffer 30 in ST12. Here, i is 0<i<(n−1), and if index I is n−1 at the current period of time T, the index becomes 0 again at the next period of time T.)

Then, the system determines whether the period of time T has elapsed in ST13. If the period of time T has not elapsed, the routine proceeds to step ST12 and the number of bit errors is accumulated and stored. If, however, the period of time T has elapsed, the system determines whether or not an E-BER alarm generation flag is set, that is, whether or not an E-BER alarm is generated, as shown in ST14.

If the E-BER alarm has not been generated, g-number of buffers from the current buffer are scoped using a sliding window. Then, the number of bit errors of the g-number of sliding window buffers is summed, and the total number of bit errors is calculated. The average number of bit errors of the sliding window buffers is then obtained using the total number of bit errors. It should be noted that the value of g can preferably be dynamically changed depending on the requirements of the transmission system.

The average number of bit errors is next compared with $N_3$ as shown in step ST15. Here, $N_3$ is the number of 10E-3 BER errors generated during the period of time T, and 10E-3 BER is the error threshold of a general transmission system. For a transmission such as a light transmission, which requires an improved service quality, the error threshold can be decreased and set to 10E-4 BER, for example.

As a result of the comparison, if the average number of bit errors is not less than $N_3$, an E-BER alarm generation flag is set in steps ST16 and ST17. However, if the average number of bit errors is less than $N_3$, the routine proceeds to step ST12.

Figure 4:
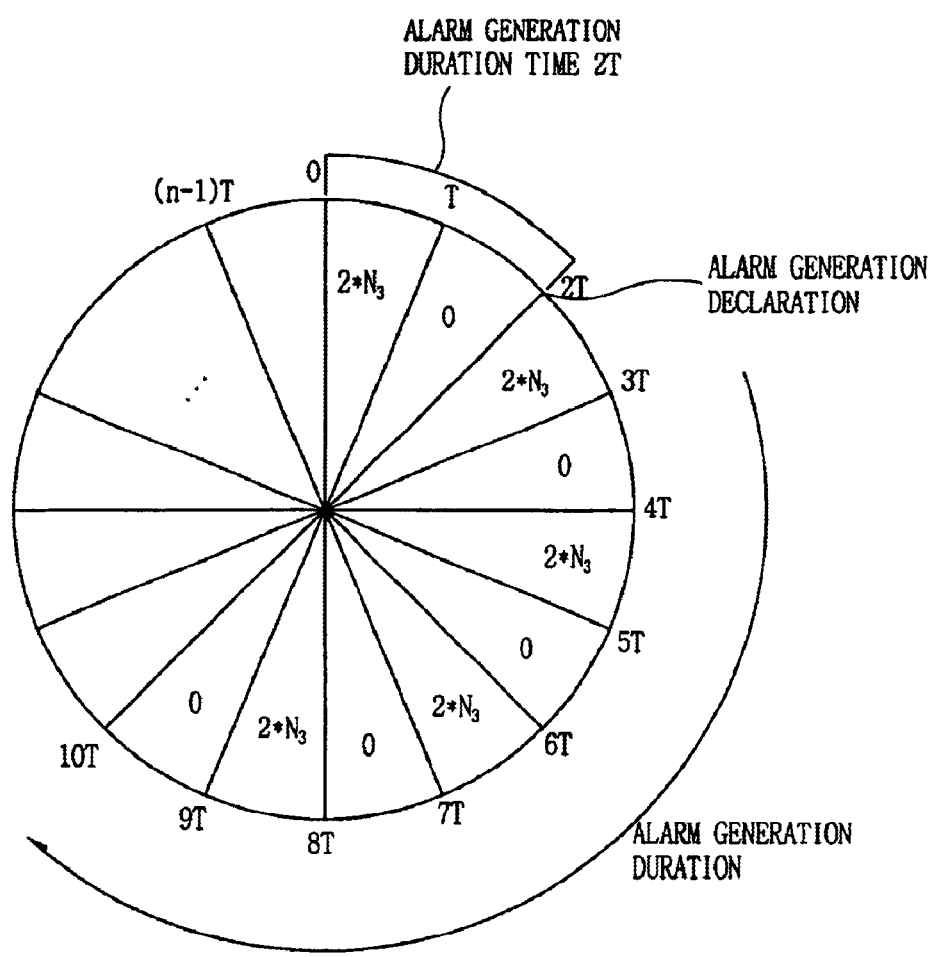
FIG. 4 is a drawing illustrating the application of a sliding window to a buffer in accordance with a preferred embodiment of the present invention.

Referring to FIG. 4, if g is 2, the alarm generation duration time is 2T, and the current buffer storing region is B[1], the scoped buffer storage region (sliding window buffer) becomes b[0] and b[1]. In addition, the total number of bit errors of the scoped storing region becomes $2*N_3$, and the average number thereof becomes $N_3$. The average number of bit errors is compared with the number of 10E-3 BER errors generated during the period of time T. As the result, since the average number of bit errors is not smaller, the E-BER alarm generation flag is set.

In the E-BER alarm generation steps in ST15, ST16, and ST17, the corresponding buffer among the plurality of buffers is scoped using a sliding window, and thereafter a method for judging whether or not the E-BER alarm is generated will be described as shown in [Mathematical Expression 1].

$$\text{compare}(B[(i-g)\% \ n]+B[(i-g+1)\% \ n]+ \ldots +B[i\%n], g*N_3) \qquad \text{[Mathematical Expression 1]}$$

If the value of [Mathematical Expression 1] is 0 or a positive number, it is determined that the total number of bit errors of the scoped sliding window buffers exceeds 10E-3. Thus, the E-BER alarm generation flag is set. If, however, the resultant value of [Mathematical Expression 1] is a negative number, it is determined that the total number of bit errors does not reach 10E-3, thus moving the sliding window as far as the period of time T and forming a sliding window of size g.

When the E-BER alarm generation flag has already been set, the step of clearing the E-BER alarm is preferably carried out. That is, as the result of checking whether or not the E-BER alarm is generated in step ST14, if it is determined that the E-BER alarm is generated, then step ST18 is subsequently carried out.

Thus, a predetermined number of buffers corresponding to an alarm clearing duration time rT are scoped, and thereafter it is determined whether or not the E-BER alarm is cleared according to the average number of bit errors of the scoped sliding window buffers, as shown in steps ST18 through ST20.

Specifically, sliding window buffers are formed by scoping r-number of buffers from the current buffer. The number of bit errors of the sliding window buffers are then summed, and thereafter the average number of bit errors is calculated, as shown in step ST18. Here, the value of r can preferably be dynamically changed according to the situation or requirements of the transmission system.

The calculated average number of bit errors is then compared to $N_4$ (the number of 10E-4 BER errors generated at the period of time T) in ST19. 10E-4 BER is the error threshold of a general transmission line (for example, E1, DS2, DS3, STM-1, etc.). For a transmission such as a light transmission, which requires an improved service quality, the error threshold of the transmission line can be set to 10E-5 BER, for example.

As a result of the comparison in step ST19, if the average number of bit errors is not larger than $N_4$, the E-BER alarm generation flag is reset in ST20.

A method for judging whether or not the E-BER alarm is generated using a sliding window will be described as in [Mathematical Expression 2].

$$\text{compare}(B[i-r)\% \ n]+B[(i-r+1)\% \ n]+ \ldots +B[i\%n], r*N_3) \qquad \text{[Mathematical Expression 2]}$$

If the value of [Mathematical Expression 1] is a positive number, it is determined that the total number of bit errors of the scoped sliding window buffers exceeds 10E-4. Thus, the E-BER alarm generation flag is maintained. However, if the resultant value of [Mathematical Expression 2] is 0 or a negative number, it is determined that the total number of bit errors does not reach 10E-4, and the E-BER alarm generation flag is reset.

As described above, in the apparatus and method for measuring the bit error ratio of a transmission system has many advantages. For example, it is possible to accurately report the degradation of the service quality of a line to an operator by accurate BER calculation under a situation where an excessive error is instantaneously generated, by storing the number of bit errors in buffers at an interval of time T, scoping these buffers by a sliding window of a prescribed size, and determining whether or not an E-BER alarm is generated using the average number of bit errors of the scoped sliding window buffers.

In addition, the system has the advantage that it can be operated to maintain a desired service quality under a situation where an excessive error is instantaneously generated, by dynamically changing the size of the sliding window according to the desired service quality.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for measuring the bit error ratio of a transmission system, comprising:

setting and initializing a plurality of buffers, which are capable of accumulating a number of bit errors in a signal of the transmission system at a prescribed interval of time T;

storing the number of bit errors generated during the period of time T in the plurality of buffers;

determining whether an Excessive Bit Error Ratio (E-BER) alarm has been generated;

selecting and monitoring a subset of the plurality of buffers from a current buffer to at least one of a first and second prescribed buffer;

determining whether the E-BER alarm should be generated based on an average number of bit errors in the monitored subset of buffers from the current buffer back to the first prescribed buffer after an elapse of the period of time T, if the E-BER alarm has not been previously generated; and determining whether the E-BER alarm should be cleared based on an average number of bit errors in the monitored subset of buffers from the current buffer back to the second prescribed buffer after an elapse of the period of time T, if the E-BER alarm has previously been generated.

2. The method of claim 1, further comprising: changing the portion of the buffers to be monitored to a desired number of buffers.

3. A method for measuring the bit error ratio of a transmission system, comprising:

setting and initializing a plurality of buffers, which accumulate a number of bit errors in a signal of the transmission system at a fixed interval of time T;

storing the number of bit errors generated during the period of time T in the plurality of buffers;

determining whether an Excessive Bit Error Ratio (E-BER) alarm has been generated;

monitoring a subset of the plurality of buffers from a current buffer to one of a first and second prescribed buffer;

determining whether the E-BER alarm should be generated based on an average number of bit errors in the monitored subset of buffers from the current buffer back to the first prescribed buffer after an elapse of the period of time T, if the E-BER alarm has not been previously generated; and determining whether the E-BER alarm should be cleared based on an average number of bit errors in the monitored subset of buffers from the current buffer back to the second prescribed buffer after an elapse of the period of time T, if the E-BER alarm has previously been generated, wherein the E-BER alarm generating step comprises:

monitoring g-number of buffers from the current buffer including the current buffer using a sliding window after an elapse of the period of time T, when the E-BER alarm is not generated as the result of determination, wherein an E-BER error generation duration time is gT, and the number of 10E-3 BER error generated at a period of time T is $N_3$;

summing the number of bit errors of the scoped sliding window buffers and calculating the average number of bit errors;

comparing the calculated average number of bit errors of the sliding window buffers with $N_3$; and performing one of setting the E-BER alarm generation flag, if it is determined that the average number of bit errors is not less than $N_3$ as the result of the comparison and not setting the E-BER alarm while reforming the sliding window buffers by moving the sliding window as far as the period of time T, if it is determined the average number of bit errors is less than $N_3$ as the result of the comparison.

4. A method for measuring the bit error ratio of a transmission system, comprising:

setting and initializing a plurality of buffers, which accumulates a number of bit errors in a signal of the transmission system at a prescribed interval of time T;

storing the number of bit errors generated during the period of time T in the plurality of buffers;

determining whether an Excessive Bit Error Ratio (E-BER) alarm has been generated;

monitoring a subset of the plurality of buffers from a current buffer to one of a First and second prescribed buffer;

determining whether the E-BER alarm should be generated based on an average number of bit errors in the monitored subset of buffers from the current buffer back to the first prescribed buffer after an elapse of the period of time T, if the E-BER alarm has not been previously generated; and determining whether the E-BER alarm should be cleared based on an average number of bit errors in the monitored subset of buffers from the current buffer back to the second prescribed buffer after an elapse of the period of time T, if the E-BER alarm has previously been generated, wherein the E-BER alarm clearing step comprises:

monitoring r-number of buffers from the current buffer including the current buffer using a sliding window after an elapse of the period of time T, if an E-BER alarm is generated as the result of determination, an E-BER error repair duration time is rT, and the number of 10E-4 BER error generated at a period of time T is $N_4$;

summing the number of bit errors of the scoped sliding window buffers and calculating the average number of bit errors;

comparing the calculated average number of bit errors of the sliding window buffers with $N_4$;

performing one of setting the E-BER alarm clearing flag, when the average number of bit errors is not more than $N_4$ as the result of the comparison and maintaining the E-BER alarm generation state, if the average number of bit errors is more than $N_4$ as the result of the comparison.

5. A method for measuring the bit error ratio of a transmission system, comprising:

setting an Excessive Bit Error Ratio (E-BER) error generation duration time for judging whether or not an excessive error is instantaneously generated, and setting an E-BER error repairing duration time for judging whether or not the E-BER alarm is cleared when an error is intermittently generated after E-BER alarm is generated;

calculating an average number of bit errors stored in a first subset of a sliding window buffers corresponding to the E-BER error generation duration time, judging whether an error is instantaneously generated according to an average number of bit errors, and generating an E-BER alarm if an excessive error is instantaneously generated; and calculating an average number of bit errors stored in a second subset of the sliding window buffers corresponding to the E-BER error repairing duration time after the generation of the E-BER alarm, judging whether or not an error is intermittently generated according to the average number of bit errors, and clearing the E-BER alarm when the error is repaired.

6. The method of claim 5, wherein the first subset and the second subset have different numbers of buffers.

7. The method of claim 5, wherein the error generation duration time and the error repairing duration time are based on a number of buffers in the first subset and the second subset respectively.

8. The method of claim 7, wherein the error generation duration time is based on the number of the buffers in the first subset multiplied by a time period T, during which the bit errors in all sliding windows are detected.

9. The method of claim 7, wherein the error repairing duration time is based on the number of the buffers in the second subset multiplied by a time period T, during with errors in all sliding windows are detected.

10. A method for measuring the bit error ratio of a transmission system, comprising:

setting an Excessive Bit Error Ratio (E-BER) error generation duration time for judging whether or not an excessive error is instantaneously generated, setting an E-BER error repairing duration time for judging whether or not the E-BER alarm is cleared when an error is intermittently generated after E-BER alarm is generated;

calculating an average number of bit errors of a sliding window buffer corresponding to the E-BER error generation duration time, judging whether an error is instantaneously generated according to an average number of bit errors, and generating an E-BER alarm if an excessive error is instantaneously generated; and calculating the average number of bit errors of the sliding window buffer corresponding to the E-BER error repairing duration time after the generation of the E-BER alarm, judging whether or not an error is intermittently generated according to the average number of bit errors, and clearing the E-BER alarm when the error is repaired, wherein the E-BER alarm generation step comprises:

setting n number of buffers capable of accumulating the number of bit errors in a signal of the transmission system and storing the number of bit errors generated at the period of time T in the corresponding buffer;

comparing whether the total number of bit errors of the sliding window buffers scoped from and including the current buffer back to a g-th buffer is more than the product of g and $N_3$ when the period of time T is elapsed and an E-BER error generation duration time is gT, wherein the number of sliding window buffers is g, and the number of 10E-3 BER errors generated at a predetermined period of time T;

determining that the total number of bit errors exceeds 10E-3 and setting an E-BER alarm generation flag for generating an E-BER alarm, if the total number of bit errors of g number of sliding window buffers is more than the product of g and $N_3$ as the result of comparison; and determining that the total number of bit errors does not reach 10E-3 and forming a sliding window of g size by moving the sliding window as far as the period of time T, if the total number of bit errors is less than the product of g and $N_3$ as the result of comparison.

11. A method for measuring the bit error, ratio of a transmission system, comprising:

setting an Excessive Bit Error Ratio (E-BER) error generation duration time for judging whether or not an excessive error is instantaneously generated, setting an E-BER error repairing duration time for judging whether or not the E-BER alarm is cleared when an error is intermittently generated after E-BER alarm is generated;

calculating an average number of bit errors of a sliding window buffer corresponding to the E-BER error generation duration time, judging whether an error is instantaneously generated according to an average number of bit errors, and generating an E-BER alarm if an excessive error is instantaneously generated; and calculating the average number of bit errors of the sliding window buffer corresponding to the E-BER error repairing duration time after the generation of the E-BER alarm, judging whether or not an error is intermittently generated according to the average number of bit errors, and clearing the E-BER alarm when the error is repaired, wherein the E-BER alarm clearing step comprises:

comparing whether the total number of bit errors of the sliding window buffers scoped from and including the current buffer back to r-th buffer is less than the product of 4 and $N_4$ when the period of time T is elapsed, if an E-BER alarm is generated, an E-BER error repair duration time is rT, the number of sliding window buffers is r, and the number of 10E-4 BER errors generated at a certain period of time T is $N_4$;

determining that the total number of bit errors is less than 10E-4 and resetting an E-BER alarm generation flag for clearing the E-BER alarm, if the total number of bit errors of r number of sliding window buffers is less than the product of 4 and $N_4$ as the result of comparison; and determining that the total number of bit errors exceeds 10E-4 and maintaining the E-BER alarm state, if the total number of bit errors of r number of sliding window buffers is not less than the product of 4 and $N_4$ as the result of comparison.

* * * * *